(12) United States Patent
Namba

(10) Patent No.: US 10,183,411 B2
(45) Date of Patent: Jan. 22, 2019

(54) IMAGE FORMING DEVICE, IMAGE READING DEVICE, AND IMAGE FORMING METHOD

(71) Applicant: Konica Minolta, Inc., Tokyo (JP)

(72) Inventor: Hironao Namba, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/701,496

(22) Filed: Sep. 12, 2017

(65) Prior Publication Data

US 2018/0071938 A1 Mar. 15, 2018

(30) Foreign Application Priority Data

Sep. 12, 2016 (JP) .................................. 2016-177525

(51) Int. Cl.
| | |
|---|---|
| *B26D 1/01* | (2006.01) |
| *B26D 5/30* | (2006.01) |
| *B26D 5/32* | (2006.01) |
| *H04N 1/00* | (2006.01) |
| *B41J 11/66* | (2006.01) |

(52) U.S. Cl.
CPC .................. *B26D 5/30* (2013.01); *B26D 1/01* (2013.01); *B26D 1/015* (2013.01); *B26D 5/32* (2013.01); *B41J 11/663* (2013.01); *H04N 1/00278* (2013.01)

(58) Field of Classification Search
CPC . B26D 5/30; B26D 1/01; B41J 11/663; B65H 35/02; B65H 35/04; G03G 15/6523; G03G 2215/00814
See application file for complete search history.

(56) References Cited

U.S. PATENT DOCUMENTS

| | | | | |
|---|---|---|---|---|
| 5,651,618 A | * | 7/1997 | Tamiya .................. | B41J 11/663 400/621 |
| 2010/0073412 A1 | * | 3/2010 | Kaieda ................ | B41J 2/16526 347/9 |

FOREIGN PATENT DOCUMENTS

| | | |
|---|---|---|
| JP | 2002346983 A | 12/2002 |
| JP | 2006208823 A | 8/2006 |

* cited by examiner

*Primary Examiner* — Julian D Huffman
(74) *Attorney, Agent, or Firm* — Osha Liang LLP

(57) ABSTRACT

An image forming device includes: an image former that forms an image for determining a cutting position, on a printing sheet; an image reader that reads the image formed on the printing sheet to acquire image data; and a controller that outputs data for determining a cutting position for a cutting batch which is a stack of at least two printing sheets. The controller obtains a position of the image according to the image data, calculates a representative value from the positions obtained respectively from a plurality of printing sheets in the cutting batch, and outputs data for determining the cutting position for the cutting batch according to the representative value.

18 Claims, 10 Drawing Sheets

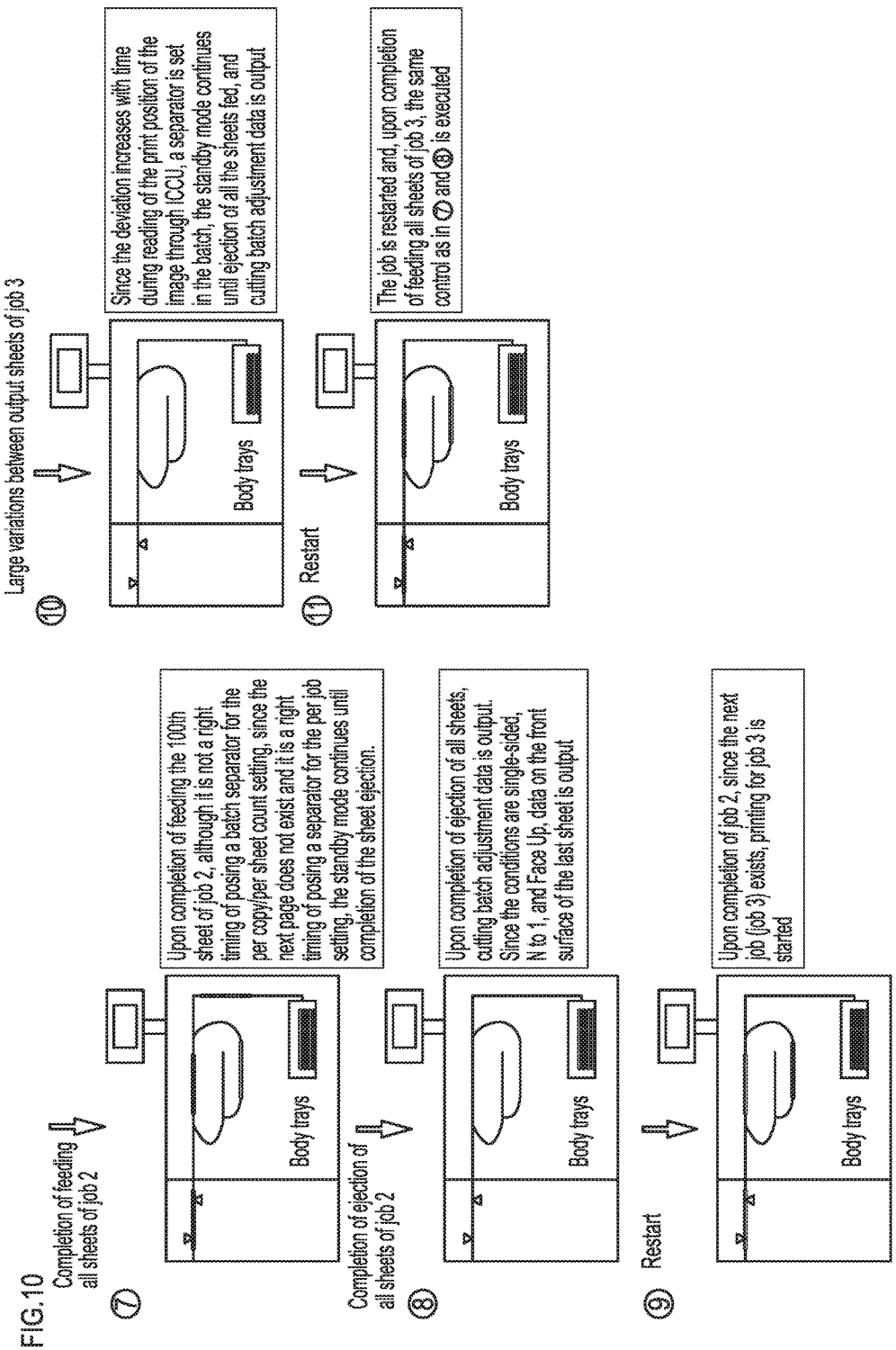

IMAGE FORMING DEVICE, IMAGE READING DEVICE, AND IMAGE FORMING METHOD

The present U.S. patent application claims a priority under the Paris Convention of Japanese patent application No. 2016-177525 filed on Sep. 12, 2016, the entirety of which is incorporated herein by references.

TECHNOLOGICAL FIELD

This invention relates to an image forming device, an image reading device, and an image forming method that enable acquisition of the results of reading of an image on a printing sheet to be cut.

BACKGROUND

In some cases, in printing with an image forming device, printing is performed on a sheet bigger than the some cases, a trim mark, such as a printers mark, is printed on a margin area other than the image area in the sheet, in the form of an additional image.

However, in some cases, the sheet is m output image and an unnecessary part is cut off with a cutting machine to produce a final output. At this time, in is aligned before arriving at the image forming unit, which causes deviated printing. In addition, although an image forming device can form images on both sides of a sheet with a duplex printing mechanism, an image deviation occurs between the front side and the rear side in some cases. These are main causes of the deviation of a cutting position.

Japanese Patent Laid-Open No. 2002-346983 proposes a device in which, to prevent variations in the event of the deviation of a trim mark, while a mounted sheet is held by a gripper, the trim mark is read by a camera, the state of the deviation of the trim mark is detected, and a transfer table is moved to position the mounted sheet.

Further, Japanese Patent Laid-Open No. 2006-208823 proposes a device including an alignment adjusting unit that adjusts the amount of skew by integrally moving a cutting processing unit, according to the detection results given by an edge position detecting sensor that detects the amount of skew on a transferred recording paper and a cutting position detecting sensor.

SUMMARY

However, according to Japanese Patent Laid-Open No. 2002-346983, a cutting position deviation in a cutting batch can be avoided but if a deviation occurs sheet by sheet, variations due to the deviation occur without being adjusted. Moreover, according to Japanese Patent Laid-Open No. 2006-208823, the amount of skew can be connected but if a position on the sheet where a printer's mark or the like is formed is misaligned, the amount of deviation cannot be canceled.

The print position inevitably vanes more or less and is entirely deviated. In cutting using a printer's mark as a guide on the sheet on the top of the cutting batch or in cutting at a desired print position on the sheet (without considering variations), variations in the print position of a printer's mark or the like are associated with a risk of a decrease in the quality after cutting. Narrowing the allowable range of positional deviation of waste sheet detection using image reading can suppress such a decrease in the quality but more waste sheets are generated.

Summary

An image forming device, an image reading device, and an image forming method of one or more embodiments of the present invention can cut with less variations in the cutting position in a cutting batch.

An image forming apparatus according to one or more embodiments of the present invention comprises an image forming device comprising:
 an image former that forms, on a printing sheet, an image for determining a cutting position;
 an image reader that reads the image formed on the printing sheet and acquires image data, and
 a controller that outputs data for determining a cutting position for a cutting batch which is a stack of at least two printing sheets, wherein
  the controller
  obtains a position of the image according to the image data.
  calculates a representative value from positions obtained respectively from a plurality of printing sheets in the cutting batch, and
  outputs data for determining the cutting position for the cutting batch according to the representative value.

In the image forming device according to one or more embodiments, the representative value is an average value, a median value, a midpoint value, or a modal value of the positions obtained respectively from a plurality of printing sheets in the cutting batch.

In the image forming device according to one or more embodiments, the image for determining the cutting position is a trimming mark indicating the cutting position, a printer's mark for real-time adjustment, or a given image formed on the printing sheet.

In the image forming device according to one or more embodiments, the controller obtains the position of the image according to the image data and corresponding original image data.

In the image forming device according to one or more embodiments, the controller makes a separation in the cutting batch per printing JOB, per JOB copy, per sequence of JOBs, or per sequence of sheets.

In the image forming device according to one or more embodiments, the controller allows a separation to be set per sequence of JOBs or sequence of sheets.

In the image forming device according to one or more embodiments, the controller sets the separation according to information about the judged cutting position.

In the image forming device according to one or more embodiments, when calculating the representative value, the controller removes the positions that are deviated, by a predetermined amount, from an expected value or the positions obtained by far.

In the image forming device according to one or more embodiments, the controller designates as a waste sheet a printing sheet with an image whose position is deviated, by a predetermined amount, from an expected value or the positions obtained by far.

In the image forming device according to one or more embodiments,
 data for determining the cutting position for the cutting batch indicates a distance from an edge of the printing sheet to the cutting position, the amount of deviation from an expected cutting position on the printing sheet, or the amount of deviation from a position of a trimming mark formed on an outer surface of a guiding printing sheet in the cutting batch, and the guiding printing sheet is the first printing sheet in the cutting batch or the last printing sheet in the cutting batch.

In the image forming device according to one or more embodiments, when an image formation is performed on only one side of the printing sheets in the cutting batch the controller designates the guiding printing sheet according to an order of the image formation and an orientation of the printing sheets after ejection.

In the image forming device according to one or more embodiments, the controller outputs data for determining the cutting position for the cutting batch, by displaying on a display, printing on a printing sheet, or storing in an internal storage and/or an external storage.

In the image forming device according to one or more embodiments, the controller enables a selection of a method of output of data for determining the cutting position for the cutting batch.

In the image forming device according to one or more embodiments, the controller enables a selection of whether to execute output of data for determining the cutting position for the cutting batch.

In the image forming device according to one or more embodiments, the controller enables the selection per separation in the cutting batch.

In the image forming device according to one or more embodiments, the image forming device further includes a cutter that cuts the cutting batch according to the cutting position for the cutting batch.

An image reading device according to one or more embodiments of the present invention comprises an image reading device comprising:

an image reader that reads an image for determining a cutting position and acquires image data, wherein the image is formed on a printing sheet; and a reading controller that outputs data for determining a cutting position for a cutting batch which is a stack of at least two printing sheets, wherein the reading controller obtains a position of the image according to the image data, calculates a representative value from the positions obtained respectively from a plurality of printing sheets in the cutting batch, and outputs data for determining the cutting position for the cutting batch according to the representative value.

An image forming method according to one or more embodiments of the present invention comprises an image forming method comprising:

acquiring image data on a read image for determining a cutting position, wherein the image is formed on a printing sheet to be cut;

obtaining the position of the image according to the image data;

calculating a representative value from the position obtained respectively from a plurality of printing sheets in the cutting batch which is a stack of at least two printing sheets; and outputting data for determining the cutting position for the cutting batch according to the representative value.

BRIEF DESCRIPTION OF THE DRAWING

The advantages and features of embodiments of the present invention will become more fully understood from the detailed description given hereinbelow and the appended drawings which are given by way of illustration only, and thus are not intended as a definition of the limits of the present invention, and wherein:

FIG. 10 is a diagram showing the last half of the process of one or more embodiments.

DETAILED DESCRIPTION OF EMBODIMENTS

Hereinafter, embodiments of the present invention will be described with reference to the drawings. However, the scope of the invention is not limited to the illustrated examples.

An image forming device of one or more embodiments of the present invention will now be described.

Figure 1:
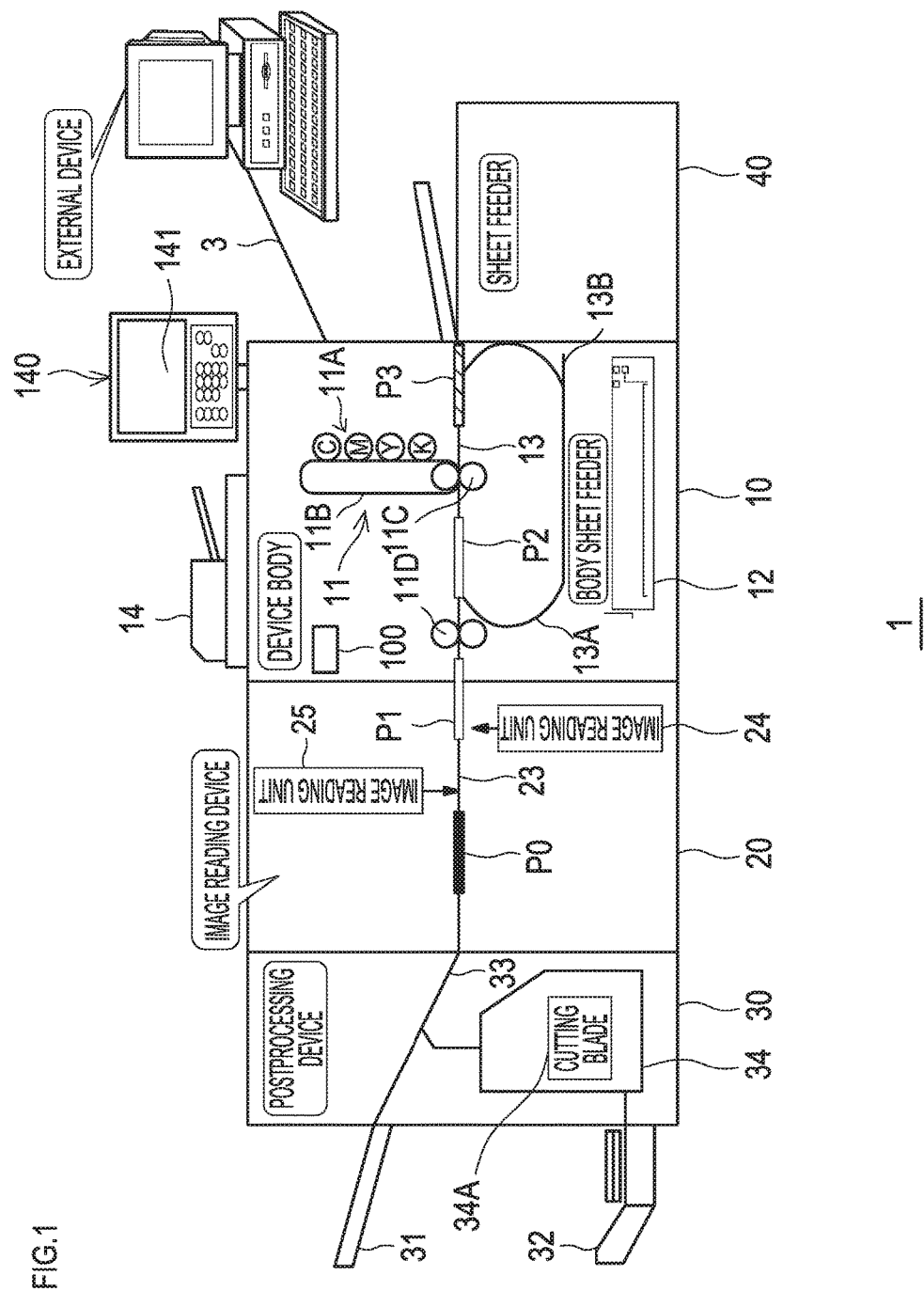
FIG. 1 is a schematic diagram showing an image forming device of one or more embodiments of the present invention.

FIG. 1 is a central cross-sectional view of the entire image forming device, showing its mechanical configuration. The configuration will now be described.

An image forming device 1 includes a device body 10, an image reading device 20 in the downstream of the device body 10, a postprocessing device 30 in the downstream of the image reading device 20, and a sheet feeder 40 in the upstream of the device body 10. These devices are mechanically and electrically connected to each other so that sheets can be carried between the devices and information communication can be established between the devices. In one or more embodiments, the image forming device 1 consists of these devices.

It should be noted that in the embodiments of the present invention, the configuration of the image forming device is not limited to the above configuration. The image forming device can consist of the device body 10 and the image reading device 20. Alternatively, the image forming device can consist of only the device body 10 and a device separated from the image forming device can include the image reading device 20, the postprocessing device 30, and the sheet feeder 40, so that an image forming device and an image forming system are made. The details will now be described.

In the device body 10, an operation unit 140 is provided over a housing. The operation unit 140 includes a touch screen LCD 141 which can be operated by an operator and can display information. The LCD 141, which serves multiple duty as an operation unit and a display, functions as an operation display unit in one or more embodiments of the present invention. It should be noted that the operation unit can be a mouse, a tablet, or the like separated from the display such that these structures collectively make up an operation display unit. In addition, the LCD 141 can be portable.

A body sheet feeder 12 including a plurality of body trays containing and feeding sheets is provided in the lower part of the device body 10. In addition, the sheet feeder 40 including a plurality of large-capacity feeding trays is provided in the upstream of the device body 10 in order to contain sheets and feeds sheets to the device body 10. It should be noted that in one or more embodiments, a sheet corresponds to a printing sheet in the embodiments of the present invention. It should be noted that the printing sheet is not limited to paper and can be a cloth, a plastic medium, or the like.

A carrying path 13 for carrying sheets fed from the body sheet feeder 12 or the sheet feeder 40 is provided in the device body 10, and an image forming unit (image former). 11 is provided in the middle of the carrying path in the device body 10. The image forming unit 11 includes photoreceptors 11A for the respective colors (cyan (C), magenta (M), yellow (Y), and black (K)), and a charger, an LD, and a developer unit, which are not shown in the drawing, around each photoreceptor 11A. Further, a midpoint transfer belt 11B for transferring the image on each photoreceptor 11A, and a secondary transfer unit 11C for transferring the image on the midpoint transfer belt 11B onto a sheet are provided.

The carrying path 13 in the downstream of the secondary transfer unit 11C is provided with a fixer 11D.

The image forming unit 11 consists of the above-described photoreceptor 11A, the charger, the LD, and the developer unit, which are not shown in the drawing, the midpoint transfer belt 11B, the secondary transfer unit 11C, the fixer 11D, and the like. It should be noted that the image forming unit is an image forming unit that can perform monochrome image forming or can print only in monochrome.

The carrying path 13 includes a reverse carrying path 13A branched from its straight path in the downstream of the fixer 11D. The reverse carrying path 13A meets the carrying path 13 at the upstream end of the image forming unit 11, after a passing path 13B is branched.

To reverse a sheet and circulate it into the image forming unit 11, the sheet is temporarily sent from the reverse carrying path 13A to the passing path 13B, is reversely sent to the reverse carrying path 13A in the downstream, and meets the carrying path 13 at the upstream end of the image forming unit 11, so that image formation is made on the rear surface of the sheet.

Figure 2:
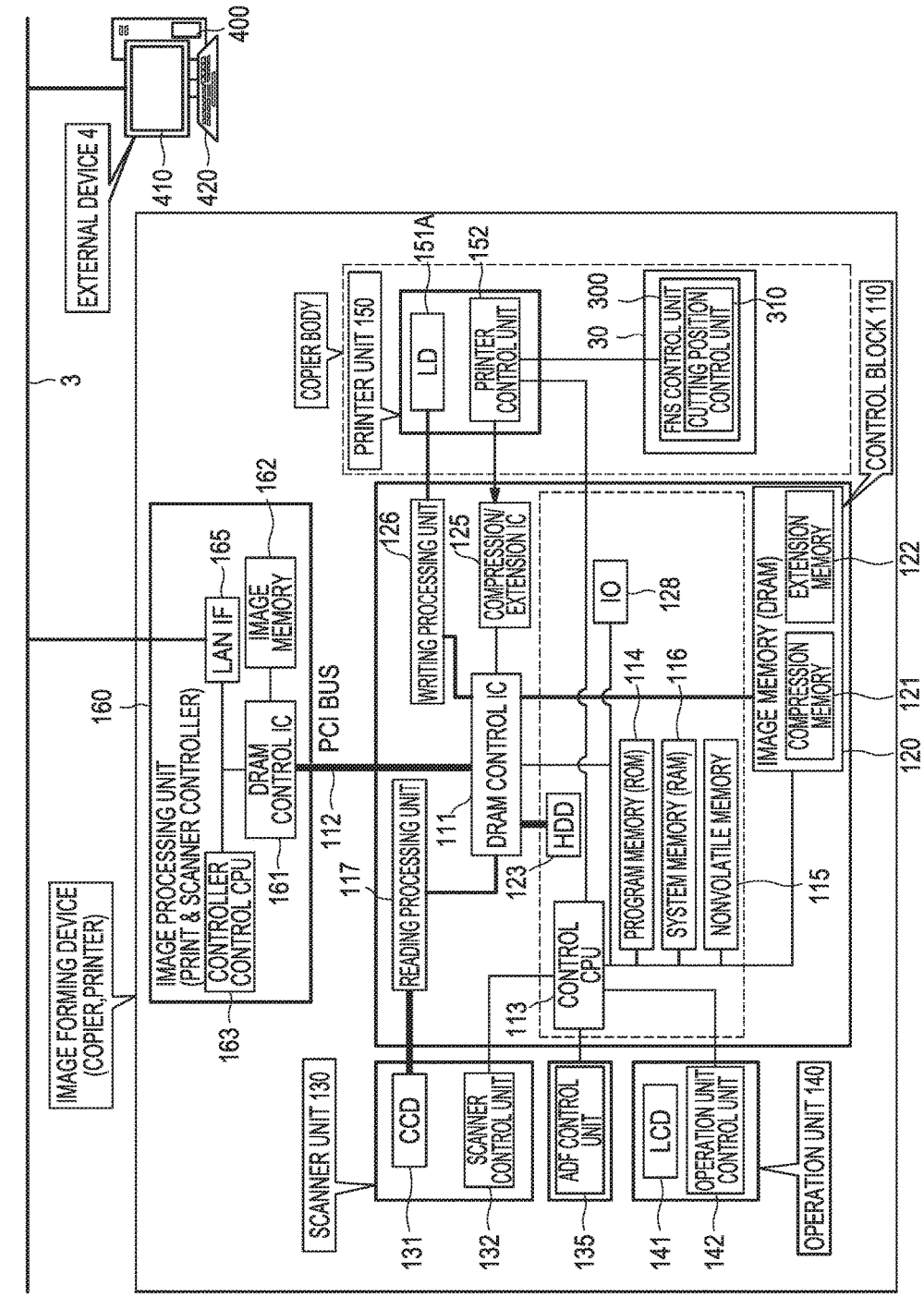
FIG. 2 shows a control block diagram of one or more embodiments.

A printer unit 150 shown in FIG. 2 consists of the above-described image forming unit 11, the body sheet feeder 12, the sheet feeder 40, the carrying path 13, the reverse carrying path 13A, and the like.

The device body 10 includes a control unit (controller) 100. The control unit 100 controls the entire image forming device 1 and consists of a CPU, programs executed by the CPU, a storage containing parameters and a work area, and the like. A hardware in the control unit 100 corresponds to a computer in one or more embodiments of the present invention and the programs include a control program used in the embodiments of the present invention.

The image reading device 20 is provided between the device body 10 and the postprocessing device 30 along the sheet carrying path.

The image reading device 20 includes a carrying path 23 having an upstream end connected to the carrying path 13 in the device body 10, and a downstream end connected to a carrying path 33 in the postprocessing device 30.

An image reading unit (image reader) 24 for reading the image on the rear surface of a sheet is provided in the upstream of the midpoint of the carrying path 23 and transmits the read results to the control unit 100. The image reading unit 24 can be a line sensor or a colorimeter that reads a point of the image.

An image reading unit 25 for reading the image on the front surface of the sheet is provided in the carrying path 23 in the downstream of the image reading unit 24 and transmits the read results to the control unit 100. The image reading unit 25 can be a line sensor or a colorimeter that reads a point of the image.

The postprocessing device 30 includes the carrying path 33 in communication with the carrying path 23 provided in the image reading device 20. The carrying path 33 has a straight line in communication with a first sheet ejecting unit 31 and a branched line in communication with a second sheet ejecting unit 32 via a postprocessing unit 34.

A sheet carried through the carrying path 23 passes the image reading units 24 and 25, then is sent the carrying path 33 of the postprocessing device 30, and then is ejected to the first sheet ejecting unit 31 without postprocessing or is subjected to predetermined postprocessing in the postprocessing unit 34 and then is ejected to the second sheet ejecting unit 32. The postprocessing unit 34 can perform more than one types of postprocessing.

The postprocessing unit 34 executes predetermined postprocessing. Examples of postprocessing include stapling, punching, binding, saddle stapling, cutting, and other appropriate processing. A postprocessing unit involving cutting treatment corresponds to a cutting device (cutter) of one or more embodiments of the present invention. If the postprocessing unit 34 performs cutting treatment, the postprocessing unit 34 includes a cutting blade 34A and performs cutting treatment with the cutting blade. In addition, a sheet that skips postprocessing is ejected to the first sheet ejecting unit 31. Sheets from the postprocessing unit 34 are ejected to the second sheet ejecting unit 32 in the form of a batch.

Alternatively, an off-line cutting device separated from the image forming device can be provided.

FIG. 2 is a control block diagram of the image forming device 1.

The device body 10 includes a control block 110, a scanner unit 130, an operation unit 140, a printer unit 150, and an image processing unit (print & scanner controller) 160 that processes image data input from an external device 4, such as a terminal PC, via a network 3 or allows image data acquired through the scanner unit 130 to be transmitted to the external device 4 or the like via the network 3.

The control block 110 includes a PCI bus 112 connected to the image processing unit (print & scanner controller) 160 and the PCI bus 112 is connected to a DRAM control IC 111. The DRAM control IC 111 is connected to an image memory (DRAM) 120. The image memory (DRAM) 120 includes a compression memory 121 for storing compressed image data, and an extension memory 122 for temporarily storing, before image formation, uncompressed image data to be printed.

Moreover, the DRAM control IC 111 is connected to a hard disc (HDD) unit 123, and the hard disc (HDD) unit 123 can store image data acquired through the scanner unit 130 and image data generated by, for example, the external device 4 connected to the image processing unit (print & scanner controller) 160.

Image data acquired through the image processing unit (print & scanner controller) 160 and image data stored in the hard disc (HDD) unit 123 are transmitted to the DRAM control IC 111 according to the print operation via the PCI bus 112.

The external device 4 includes an external control unit (controller) 400 that controls the entire external device 4, operation keys 420, and an operation screen 410. The external control unit 400 includes a CPU and a program that operates on the CPU. The external device 4 can serve as a management device that controls the image forming device or the image forming system. In this case, the operation keys 420 and the operation screen 410 correspond to operation units in one or more embodiments of the present invention. In addition, the hardware of the external control unit 400 here corresponds to a computer in the embodiments of the present invention.

In addition, the control block 110 includes a control CPU 113. The control CPU 113 is connected to the DRAM control IC 111.

Further, the control CPU 113 is connected to a program memory (ROM) 114 that is composed of a ROM and contains a program and the like for operating the control CPU 113, a system memory (RAM) 116 that is composed of a RAM and used as a work area and the like, and a nonvolatile memory 115 composed of a flash memory, for example.

The nonvolatile memory 115 contains information about the initial settings of the device body 10, information about machine settings, such as process control parameters, post-processing settings, data of sheet information, information about tray settings, the judgement area for cutting positions, image data of a printer's mark, a method of calculating the representative value in a cutting position, settings for calculating the representative value of a cutting batch, and information about settings, such as the threshold of data to be removed.

The control CPU 113 can read nonvolatile data in the nonvolatile memory 115 and write target data to the nonvolatile memory 115.

The control CPU 113 executes a predetermined operation with the program stored in the program memory (ROM) 114 and controls the operations of the device body 10, the image reading device 20, and the postprocessing device 30 according to the information about machine settings, information about print settings, output settings, and the like. The program can serve as a control program used in one or more embodiments of the present invention and can be stored in a portable storage for use.

The control CPU 113 is included in a control unit (controller) of one or more embodiments of the present invention together with the program memory (ROM) 114, the system memory (RAM) 116, the nonvolatile memory 115, and the like, and can control creation of data for executing a job, judgement of a cutting position, calculation of the representative value in the cutting position, and determination of the cutting position according to the representative value, for example.

The control CPU 113 can perform job output setting, operation instruction, setting, and the like through the operation unit 140.

The scanner unit 130 includes a CCD 131 that performs optical reading and a scanner control unit (controller) 132 that controls the entire scanner unit 130. The scanner control unit 132 is connected to the control CPU 113 such that they can serially communicate with each other. In addition, the CCD 131 is connected to a reading processing unit 117 that processes image data read by the CCD 131, and the reading processing unit 117 is connected to and can be controlled by the DRAM control IC 111.

The reading processing unit 117 performs analog signal processing, analog to digital (A/D) conversion, shading, and other processing on analog image signals from the CCD 131 to generate digital image data which is then output to a compression/extension IC 125.

In addition the control CPU 113 is connected to and can be controlled by an ADF control unit (controller) 135. The ADF control unit 135 controls an inflow-type automatic document feeding device (ADF) 14.

The scanner unit 130 reads the images on documents placed on the upper platen glass of the device body 10 and documents automatically carried by an inflow-type automatic document feeding device (ADF) 14.

The operation unit 140 serves multiple duty as a display and an operation unit, and includes an LCD 141 including a touch screen and an operation unit control unit (controller) 142 that controls the entire operation unit. The operation unit control unit 142 is connected to the control CPU 113 such that they can serially communicate with each other.

In the operation unit 140, the LCD 141 enables, upon control by the control CPU 113, output condition setting of the device body 10, input of machine settings such as operation control conditions, input of settings of sheet information (size and sheet type) for each feeding tray, postprocessing setting, display of the representative value in a cutting position, display of adjustment for the cutting device, and display of desired information such as a message, for example.

The DRAM control IC 111 is connected to the compression/extension IC 125 that can compress or extend image data. The DRAM control IC 111 controls, according to an instruction from the control CPU 113, compression of image data and extension of compressed image data by the compression/extension IC 125 and controls input/output of image data to/from the image memory (DRAM) 120.

A writing processing unit 126 is connected to the image forming unit 11 including an LD 151A of the printer unit 150 and the like and generates write data used for the operation of the LD 151A according to image data.

The printer unit 150 includes a printer control unit (controller) 152 that controls the entire printer unit 150 (e.g., sheet feeding, image formation, sheet ejection, postprocessing, and cutting). The printer control unit 152 is connected to the control CPU 113 such that they can serially communicate with each other. The printer control unit 152 operates with control instructions from the control CPU 113, controls the printer unit 150, and performs sheet carrying and image formation. In addition, the printer control unit 152 can instruct the compression/extension IC 125 to extend compressed image data.

In addition, the printer control unit 152 is connected to and can be controlled by a FNS control unit (controller) 300 in the postprocessing device 30. The printer control unit 152 can instruct the FNS control unit 300 to perform postprocessing, according to an instruction from the control CPU 113, and can acquire information about the state of the postprocessing device 30 from the FNS control unit 300. The FNS control unit 300 can control the entire postprocessing device 30 and controls carrying path switching and postprocessing in the postprocessing unit 34. The FNS control unit 300 can be composed of a CPU, a program for operating the CPU, and the like.

The FNS control unit 300 includes a cutting position control unit (controller) 310. The cutting position control unit 310 can move the cutting blade to a cutting position according to data for determining a cutting position. The cutting position control unit adjusts the positions of the cutting blade and the sheet relatively to each other and does not necessarily configured to move the cutting blade. For example, the sheet can be moved instead without moving the cutting blade.

Further, the PCI bus 112 connected to the DRAM control IC 111 is connected to a DRAM control IC 161 of the image processing unit (print & scanner controller) 160. When the device body 10 is used as a network printer or network scanner, the image processing unit (print & scanner controller) 160 receives, at the device body 10, image data and the like from the external device 4 connected to the network 3, and transmits image data, which is acquired through the scanner unit 130, to the external device 4 connected to the network 3.

In the image processing unit (print & scanner controller) 160, the DRAM control IC 161 is connected to an image memory 162 composed of a DRAM, for example. Further, in the image processing unit (print & scanner controller) 160, the common bus is connected to the DRAM control IC 161, a controller control CPU 163 that controls the entire image processing unit (print & scanner controller) 160, and a LAN interface 165. The LAN interface 165 is connected to the network 3. The LAN interface 165 in one or more embodiments corresponds to a communication unit of the embodiments of the present invention.

In addition, the control CPU 113, which is connected to an IO 128, can acquire signals from various sensors in and out of the image forming device 1 and can transmit control signals to the image reading units 24 and 25 and acquire image reading results from the image reading units 24 and 25, for example.

The basic operation of the image forming device 1 will now be explained.

First, a process for accumulating image data in the image forming device 1 will be explained.

First, the case where, in the image forming device 1, the scanner unit 130 reads an image and image data is generated will be explained. In the scanner unit 130, the CCD 131 optically reads a document. At this time, the scanner control unit 132 receiving an instruction from the image control CPU 113 controls the operation of the CCD 131. The document can be read by the inflow-type automatic document feeding device (ADF) 14 while the document is fed or when the document is placed on the platen glass.

The control CPU 113 operates with a program and issues a command to the scanner unit 130 on the basis of the operation using the operation unit 140. An image read by the CCD 131 is subjected to data processing in the reading processing unit 117, image data after data processing is transmitted to the compression/extension IC 125 via the DRAM control IC 111 and then is compressed by a predetermined method. Compressed data is stored in the compression memory 121 via the DRAM control IC 111. To store data in the hard disc (HDD) unit 123, data temporarily stored in the compression memory 121 is transmitted to the hard disc (HDD) unit 123 via the DRAM control IC 111.

In addition, image data is input to the image forming device 1 via the network 3. Examples of the image data include image data generated by an application program, such as the external device 2, and image data generated by other image forming devices. The data is received at the image processing unit (print & scanner controller) 160 via the network 3 and the LAN interface 165 and is temporarily stored in the image memory 162 through the DRAM control IC 161. The data stored in the image memory 162 is transmitted to the DRAM control IC 111 via the PCI bus 112 and is temporarily stored in the extension memory 122. The data stored in the extension memory 122 is transmitted to the compression/extension IC 125 via the DRAM control IC 111 to be subjected to compression, and then is stored in the compression memory 121 via the DRAM control IC 111. To store the data in the hard disc (HDD) unit 123, the data temporarily stored in the compression memory 121 is transmitted to the hard disc (HDD) unit 123 via the DRAM control IC 111.

Next, to output the image through the image forming device 1, the data stored in the hard disc (HDD) unit 123 is temporarily stored in the compression memory 121 via the DRAM control IC 111. The data stored in the compression memory 121 is transmitted to the compression/extension IC 125 via the DRAM control IC 111 to be extended. The extended data is transmitted to the writing processing unit 126 via the DRAM control IC 111 to generate write data which is written to a photoreceptor 151B through the LD 151A.

In the printer unit 150, the printer control unit 152 receiving an instruction from the image control CPU 113 controls the body sheet feeder 12, the sheet feeder 40, the carrying path 13, and other components. In the printer unit 150, image formation, transfer to the sheet, fixation, carry to the postprocessing device 30 via the carrying path, and postprocessing in the postprocessing device 30, for example, are performed in sequence for printing out. FIG. 1 shows that sheets P0 to P3 are sequentially carried and printing and carry are performed in the image forming unit 11.

In addition, the external device 4 can control the image forming device or the image forming system as a management device. The management device enables judgement of a cutting position, calculation of the representative value, and output of the adjusted value of the cutting position according to the representative value. In this case, the external control unit serves a control unit (controller) in one or more embodiments of the present invention, and the program operating in the external control unit serves as a control program used in the embodiments of the present invention.

Further, the device body 10 can acquire the image reading results, which are read by the image reading unit 24 and/or the image reading unit 25 in the image reading device 20, at the control CPU 113 through the IO 128, and can judge the cutting position in each page from printer's marks or given images in the image reading results. An element with which the cutting position is judged can be predetermined and can be set by the user via the operation unit 140.

For a printer's mark, the image processing unit (print & scanner controller) 160 in the image forming device can perform image superimposition processing in which the image data of the printer's mark is superimposed on image data, when an image transmitted from an external device is converted to an image for printing, and can print an image for the printer's mark during image formation in the image forming unit 1. Alternatively, a sheet on which a printer's mark is printed in advance can be used.

Figure 3:
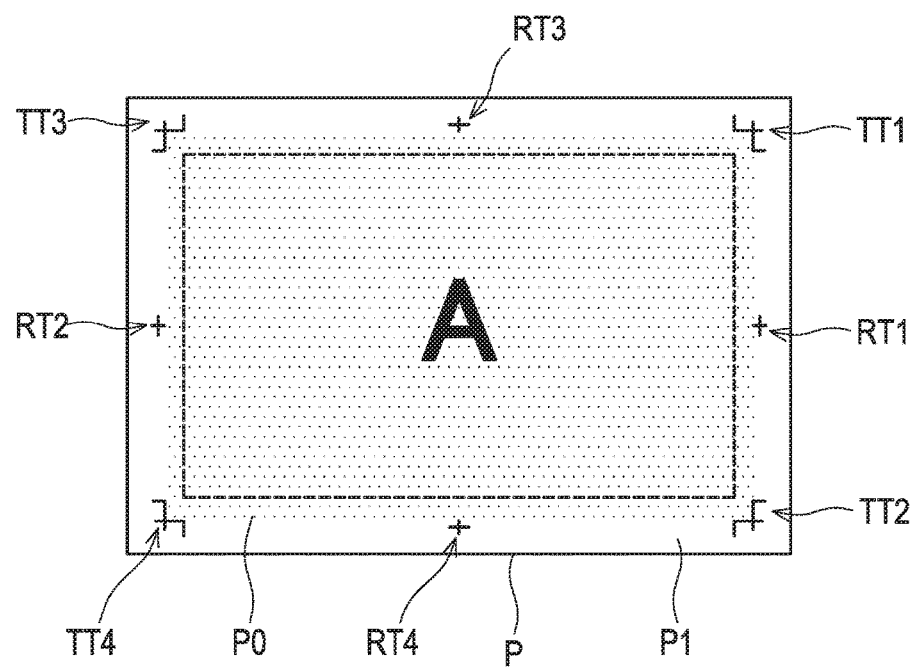
FIG. 3 is a diagram showing a sheet to be cut.

FIG. 3 shows the state of a sheet P on which trim marks are formed.

For the printed portion (solid portion; P0) on the sheet P, cutting is done along the line inside the trim marks TT1 to TT4 in the four corners. With printing beyond the dotted line, a blank portion never appears even in the event of deviation during a cutting process. Meanwhile, in the event of deviation during a cutting process, the actual printing may differ from the expected after-cut printing (for example, in the event of a horizontal deviation in the drawing, a mismatch occurs between the middle of the printing ("A") in the horizontal direction and the middle of the after-cut sheet in the horizontal direction). It should be noted that RT1 to RT4 are center marks. The corner marks of trim marks TT1 and TT4 and center marks RT1 to RT4 can be used for real-time adjustment.

Figure 4:
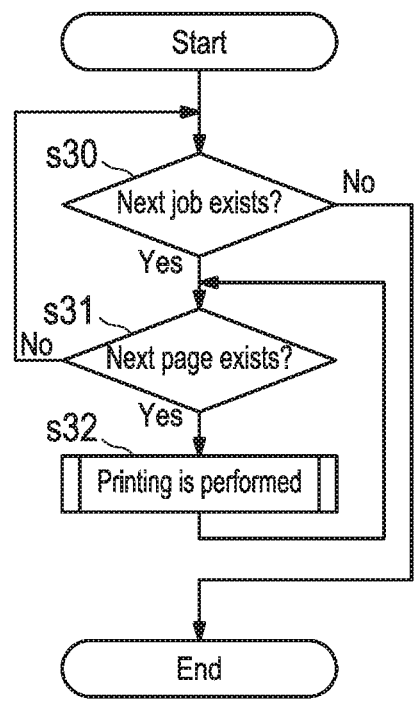
FIG. 4 is a flow chart showing a conventional process for job printing.

A conventional process for executing a job will now be explained with reference to the flow chart shown in FIG. 4.

Upon initiation, if the next job exists is determined (Step s30). If the next job does not exist (Step s30, No), the process terminates. If the next job exists (Step s30, Yes), if the next page exists is determined (Step s31).

If the next page does not exist (Step s31, No), the process returns to Step s30 and if the next job exists is determined.

If the next page exists in Step s31 (Step s31, Yes), printing is performed (Step s32) and the process returns to Step s31 to determine if the next page exists.

Repetition of this process may cause variations in the print position of the trim mark between pages.

Figure 5:
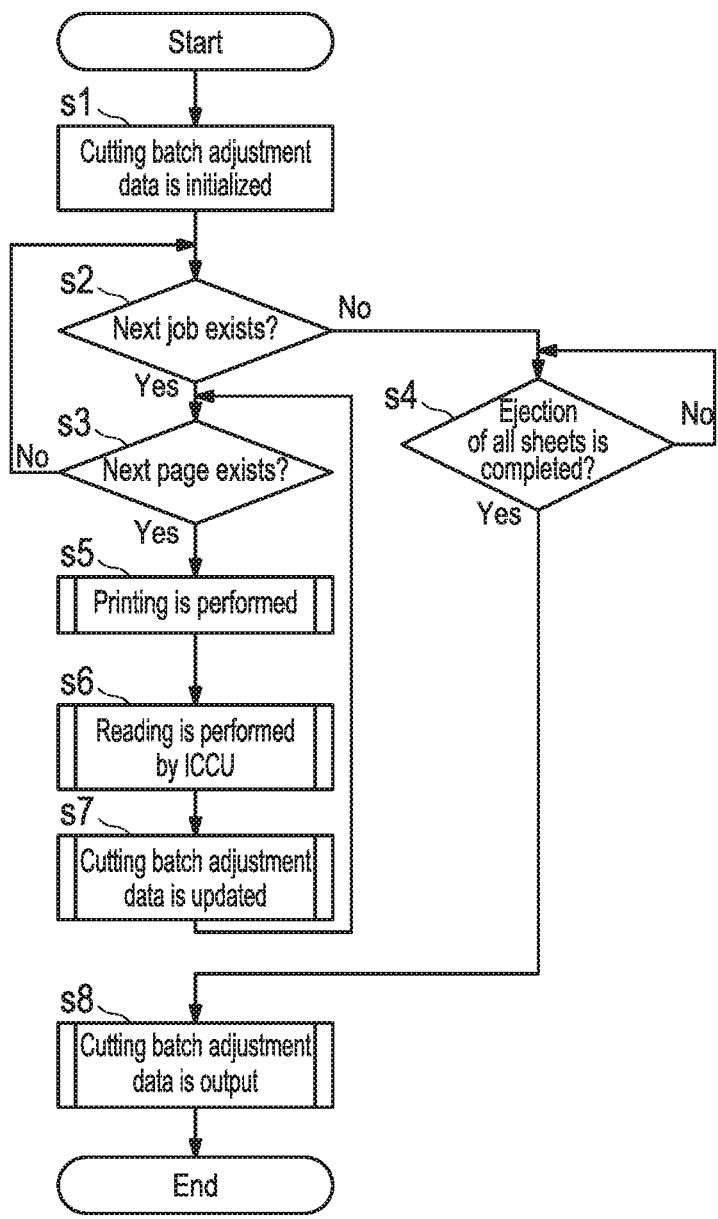
FIG. 5 is a flow chart showing a control process in one or more embodiments of the present invention.

A process in one or more embodiments for reducing variations by reading cutting positions will now be explained with reference to the flow chart of FIG. 5. The following process is executed under control by a control unit (controller).

Upon initiation, data for determining a cutting position (hereinafter referred to as cutting batch adjustment data) is initialized (Step s1) and if the next job exists is determined (Step s2). If the next job does not exist (Step s2, No), if ejection of all sheets is completed is determined (Step s4). The standby mode continues until the completion of ejection of all sheets (Step s4, No), and if ejection of all sheets is completed (Step s4, Yes), cutting batch adjustment data is output (Step s8) and the process terminates.

If the next job exists in Step s2 (Step s2, Yes), if the next page exists is determined (Step s3). If the next page does not exist (Step s3, No), the process returns to Step s2 and if the next job exists is determined.

If the next page exists in Step s3 (Step s3, Yes), printing is performed (Step s5). Next, the image reading device reads the image on the sheet (Step s6). It should be noted that in the drawing, the image reading device is denoted by ICCU. Job information can contain information indicating which image reading unit reads the image in the image reading device. Either or both of the front and rear surfaces of the sheet can be read.

Next, the cutting position is determined from the reading results, the representative value of a predetermined cutting batch is calculated and the cutting batch adjustment data is updated (Step s7). Next, the process proceeds to Step s3 and if the next page exists is determined.

It should be noted that when the image is read by the image reading device and the cutting position is determined, various images can be used. For example, the cutting position can be determined from the position of a trimming mark, the position of a printer's mark formed for real time, the position of a given image formed on the sheet and the like. The given image can be designated by the user through the operation unit 140 or the like. The cutting position can be indicated by coordinates on the sheet, the distance from the sheet edge, or the like. For the given image, the amount of deviation can be determined by contrast with the original image data.

To calculate the representative value from the determined cutting position, calculation is performed per predetermined cutting batch. A predetermined cutting batch can be predetermined and separated, for example, per job during printing, copy for the job, sequence of jobs, or sequence of sheets. When separation is made per sequence of jobs or sequence of sheets, the user can set a separation via the operation unit. Separation setting can be performed as machine setting or job setting.

Further, the control unit can set a separation according to information about the determined cutting position and the intermediate result of the representative value. For example, when the amount of deviation of the cutting position starts to distinctly change, its tendency changes with time, or the amount of deviation gradually increases, the separation can be automatically changed.

The control unit calculates the representative value per predetermined cutting batch, according to each determined cutting position. A representative value can be calculated as an average value, a median value, a midpoint value, a modal value, or the like and is not limited to a particular value in one or more embodiments of the present invention. The representative value can differ from one cutting batch to another. The type of representative value can be preset and stored in the nonvolatile memory or the like and the calculation scheme can be read out for use during calculation. Alternatively, the calculation scheme can be set by job setting and can be set by the user at an appropriate time via the operation unit 140.

It should be noted that during the calculation of the representative value, data with a large amount of deviation can be removed. Removal can be performed when the amount of deviation and the amount of cut adjustment from the calculated representative values and the amount of deviation from a predetermined expected value, for example, are large. A threshold of the amount of deviation is prepared, and the amount beyond the threshold can be removed from the calculation of the representative value. A sheet from which this data is removed can be removed from the output, as a waste sheet. In this case, information about the waste sheet can be displayed on the operation unit or the like or can be notified to a remote terminal and a management device, for example. In addition, removal of the waste sheet can be performed automatically under control by the control unit.

The control unit outputs cutting batch position adjustment data based on the calculated representative value.

The amount of cut adjustment can be indicated as the amount of deviation from an original expected cutting position, coordinates, or the amount of deviation from the determined cutting position in a specific page.

In addition, cutting batch adjustment data can be indicated as the amount of deviation from the determined cutting position in a specific page, that is, the print position of a trimming mark formed on an outer surface of the guiding printing sheet(s) of the batch: the first print sheet and/or the last print sheet. Here, the control unit can automatically select the guiding printing sheet(s) of the batch according to the print order (1 to N or N to 1) and ejection direction (face up or face down).

The control unit involves a step of outputting cutting batch adjustment data. There is not limitation on the method of outputting cutting batch adjustment data and various methods can be used. In one method, display contents related to data for determining the cutting position is printed on the sheet. For example, a page provided with data for determining the cutting position is printed following the last page of the cutting batch. Note that the print position is not limited to this and printing can be performed in a cut margin or the like in the last page, for example.

In addition, data contents are output to be displayed on the display. During these, the user can perform adjustment in the cutting device according to the displayed contents. In one or more embodiments, it is displayed on the operation unit 140.

Another method involves storage to an internal storage, such as an HDD, or an external storage. The external storage can be a USB memory temporarily connected to the image forming device and can be connected through a cable or a network for storage.

Still another method involves output by notification through the communication unit. A notification can be given to the cutting device and adjustment can be automatically performed. Further, a notification can be given to an external device through a communication system such as a messaging system, for example, by email. The communication system is either a wired system or wireless system.

One or more of these methods for output can be selected and set by the user. The settings can be machine settings or job settings and can differ from one cutting batch to another.

The user can set whether a process for calculating the above-described representative value or a process for outputting cutting batch adjustment data is executed, per cutting batch. The settings can be made during machine setting or job setting, for example. Further, whether these processes are executed can be determined according to the amount of deviation between the determined cutting position and the expected value.

Figure 6:
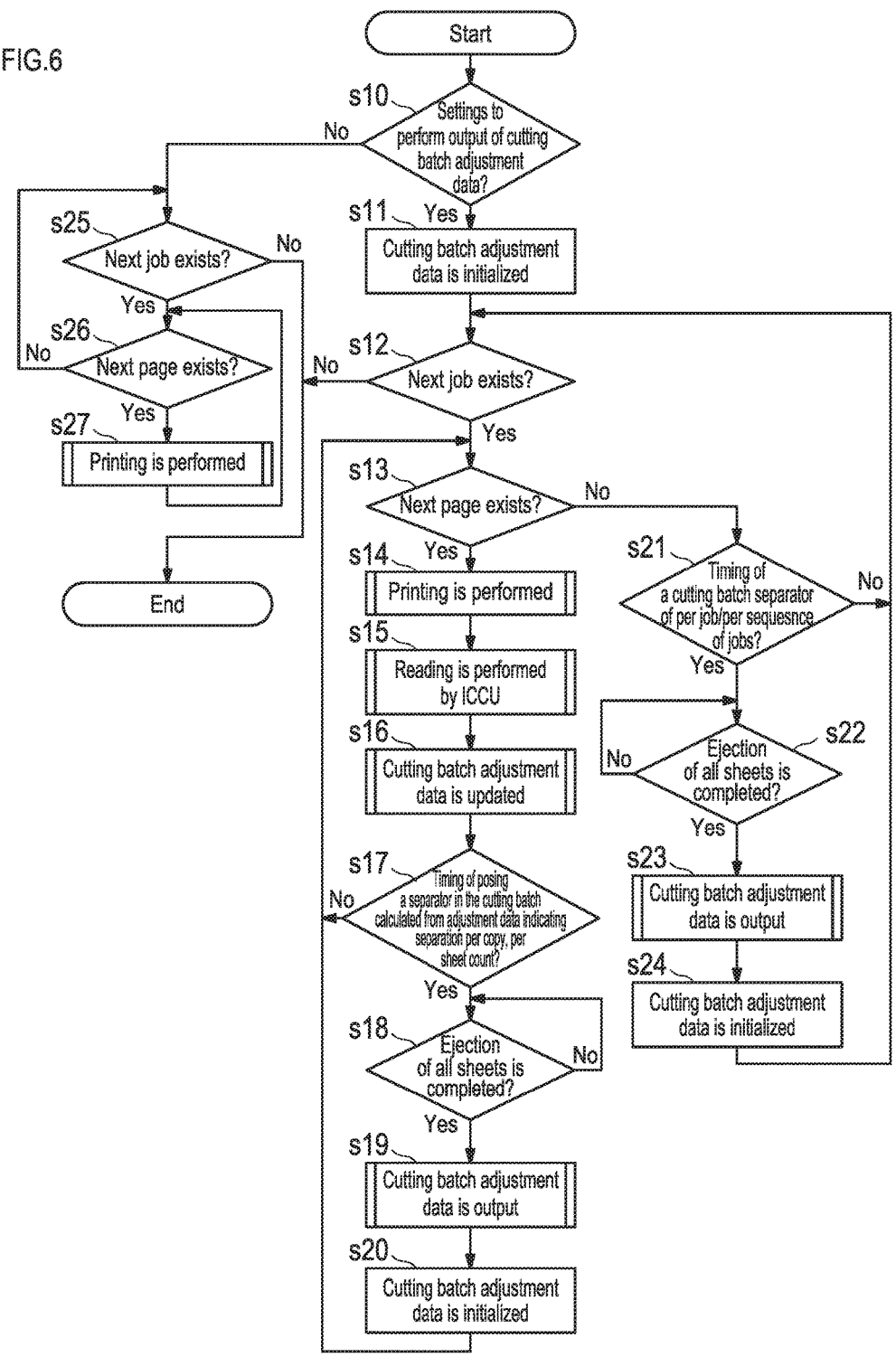
FIG. 6 is a flow chart showing a control process in another embodiment.

Another embodiment will now be described with reference to the flow chart of FIG. 6. The following process is executed under control by the control unit.

Upon initiation of the process, whether the settings require output of cutting batch adjustment data is determined (Step s10). If the settings do not require output of cutting batch adjustment data (Step s10, No), the process is same as the regular process and proceeds to Step s25 to determine whether the next job exists (Step s25). If the next job does not exist (Step s25, No), the process ends. If the next job exists (Step s25, Yes), if the next page exists is determined (Step s26). If the next page does not exist (Step s26, No), the process returns to Step s25 and if the next job exists is determined. If the next page exists (Step s26, Yes), printing is performed (Step s27) and the process returns to Step s26 to determine if the next page exists.

If the settings require output of cutting batch adjustment data in Step s10 (Step s10, Yes), cutting batch adjustment data is initialized (Step s11) and if the next job exists is determined (Step s12). If the next job does not exist (Step s12, No), the process terminates.

If the next job exists (Step s12, Yes), if the next page exists is determined (Step s13). If the next page does not exist (Step s13, No), if it is a right timing of posing a cutting batch separator is determined according to the settings that determine whether separation is made per job, per sequence of jobs, or the like (Step s21). If it is not a right timing of posing a separator (Step s21, No), the process returns to Step s12 and if the next job exists is determined. If it is a right timing of posing a separator (Step s21, Yes), if ejection of all sheets is completed is determined (Step s22). The standby mode continues until completion of the ejection (Step s22, No), and upon completion of the ejection (Step s22, Yes), cutting batch adjustment data is output by a set scheme (Step s23). Next, cutting batch adjustment data is initialized (Step s24, No) and the process returns to Step s12 and if the next job exists is determined.

In Step s13, if the next page exists (Step s13, Yes), printing is performed (Step s14), the image is read with the image reading device (ICCU) (Step s15), a cutting position is determined, the representative value is calculated to create cutting batch adjustment data, and cutting batch adjustment data is updated (Step s16).

Next, if it is the timing of posing a separator in the cutting batch calculated from cutting batch adjustment data indicating separation per copy, per sheet count, or the like is determined (Step s17). If it is not a right timing of posing a separator (Step s17, No), the process returns to Step s13 and if the next page exists is determined. If it is a right timing of posing a separator (Step s17, Yes), if ejection of all sheets is completed is determined (Step s18). If ejection of all sheets is uncompleted (Step s18, No), the standby mode continues until completion of the ejection. If ejection of all sheets is completed (Step s18, Yes), cutting batch adjustment data is output (Step s19), cutting batch adjustment data is then initialized (Step s20), and the process returns to Step s13 to determine if the next page exists.

Figure 7:
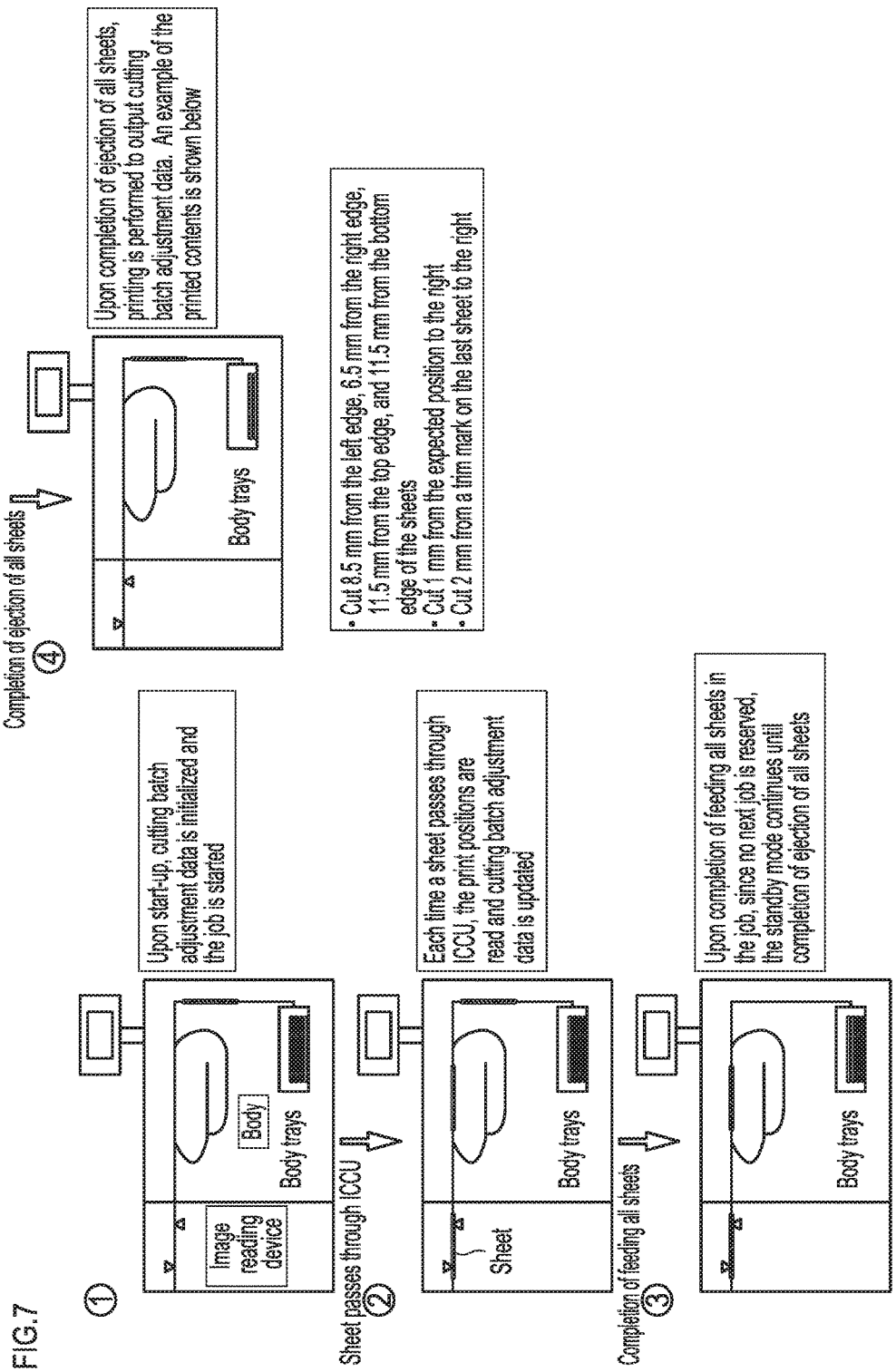
FIG. 7 is a diagram showing the details of a process in one or more embodiments of the present invention.

The process will now be explained in detail referring to a schematic view of an image forming device including the image reading device shown in FIG. 7.

In this example, a job of one copy of 10 single-sided sheets is executed and no following job is reserved.

1) Upon start-up, cutting batch adjustment data is initialized and the job is started.
   Sheets on which images are formed according to the job pass through the image reading device (ICCU).
2) Each time a sheet passes through the image reading device (ICCU), the print positions of printer's marks are read and data for determining the cutting position is sequentially updated.
   Completion of feeding all sheets.
3) Upon completion of feeding all sheets in the job, since no next job is reserved, the standby mode continues until completion of ejection of all sheets.
   Completion of ejection of all sheets
4) Upon completion of ejection of all sheets, printing is performed to output cutting batch adjustment data. An example of the printed contents is shown in the drawing described below.

The printed contents show that the cutting position is 8.5 mm from the left edge, 6.5 mm from the right edge, 11.5 mm from the top edge, and 11.5 mm from the bottom edge of the sheets. They also show that it is deviated by 1 mm from the expected position to the right and 2 mm from a trim mark on the last sheet to the right.

An expected cutting position in the sheets is a cutting position determined when the transfer sheet size and the after-cut sheet size overlap with their top, bottom, left, and right edges and center aligned.

Figure 8:
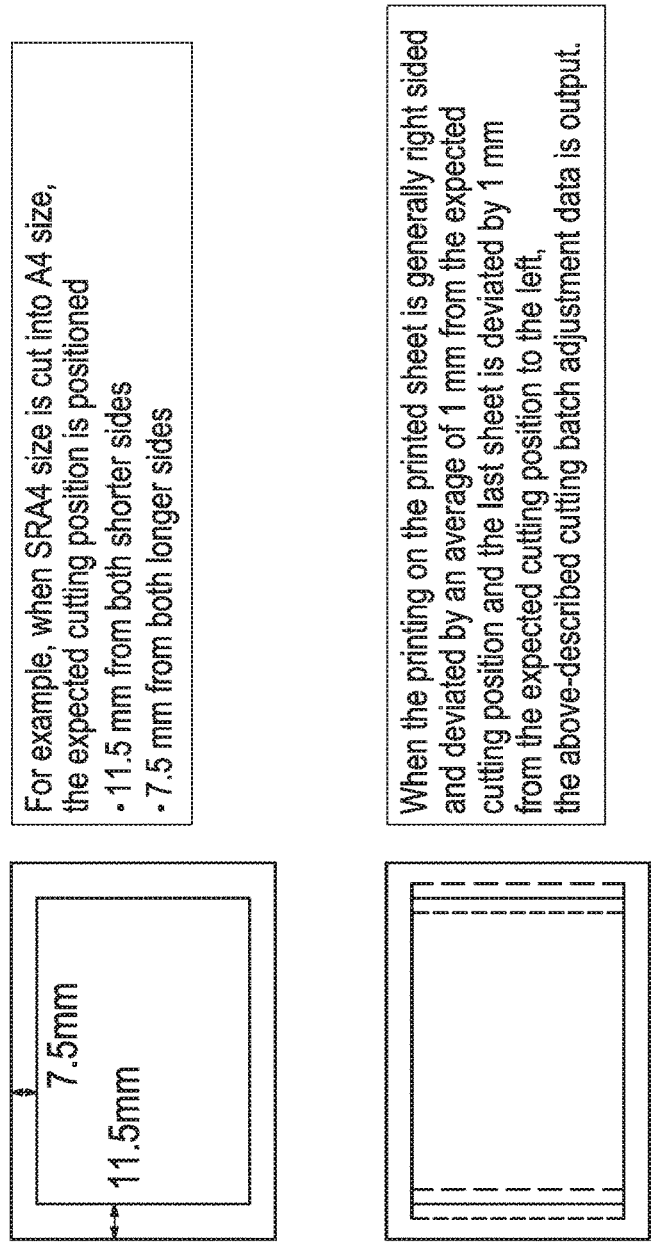
FIG. 8 is a diagram for explaining data for determining a cutting position in one or more embodiments.

FIG. 8 shows a specific example of the sheet.

For example, when SRA4 size is cut into A4 size, the expected cutting position is positioned 11.5 mm from both shorter sides and 7.5 mm from both longer sides. As shown in the drawing described below, when the printing on the printed sheet is generally right sided and deviated by an average of 1 mm from the expected cutting position (the dashed line on the right side) and the last sheet is deviated by 1 mm from the expected cutting position to the left (the dotted line on the left side), the above-described cutting batch adjustment data is output.

Figure 9:
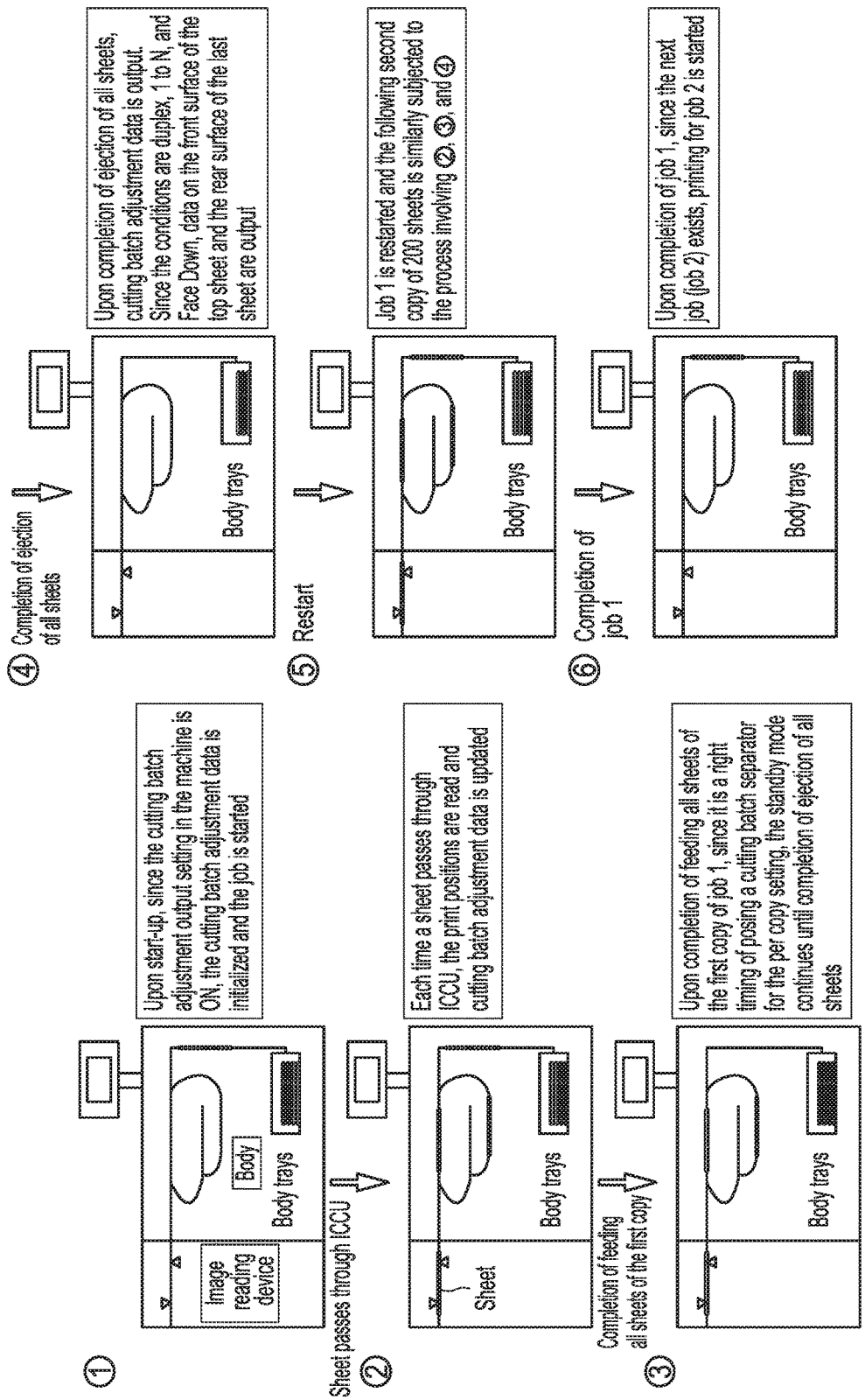
FIG. 9 is a diagram showing the details of the first half of the process in one or more embodiments of the present invention.

Another specific process will now be explained with reference to FIGS. 9 and 10.

In this example, while the cutting batch adjustment output setting in the machine is ON, job 1 in which cutting batch adjustment output is performed per copy and the conditions are duplex, 1 to N. Face Down, 200 sheets, and two copies, and jobs 2 and 3 in which cutting batch adjustment output is performed per job and the conditions are single-sided. N to 1, Face Up, 100 sheets, and one copy are sequentially executed in the order of jobs 1, 2, and 3 (at the initiation of job 1, jobs 2 and 3 are in the reserved state).

1) Upon start-up, since the cutting batch adjustment output setting in the machine is ON, the cutting batch adjustment data is initialized and the job is started.
   Sheets on which images are formed according to the job pass through the image reading device (ICCU).
2) Each time a sheet passes through the ICCU, the print positions are read and cutting batch adjustment data is updated.
   Completion of feeding all sheets of the first copy
3) Upon completion of feeding all sheets of the first copy of job 1, since it is a right timing of posing a cutting batch separator for the per copy setting, the standby mode continues until completion of ejection of all sheets.
   Completion of ejection of all sheets
4) Upon completion of ejection of all sheets, cutting batch adjustment data is output. Since the conditions are duplex, 1 to N. and Face Down, data on the front surface of the top sheet and the rear surface of the last sheet are output.
   Restart
5) Job 1 is restarted and the following second copy of 200 sheets is similarly subjected to the process involving 2), 3), and 4).
   Completion of job 1
6) Upon completion of job 1, since the next job (job 2) exists, printing for job 2 is started.
   Completion of feeding all sheets of job 2
7) Upon completion of feeding the 100th sheet of job 2, although it is not a right timing of posing a batch separator for the per copy/per sheet count setting, since the next page does not exist and it is a right timing of posing a separator for the per job setting, the standby mode continues until completion of the sheet ejection.
   Completion of ejection of all sheets of job 2
8) Upon completion of ejection of all sheets, cutting batch adjustment data is output. Since the conditions are single-sided, N to 1, and Face Up, data on the front surface of the last sheet is output.
   Restart
9) Upon completion of job 2, since the next job (job 3) exists, printing for job 3 is started.
   Large variations between output sheets of job 3
10) Since the deviation increases with time during reading of the print position of the image through the image reading device (ICCU), a separator is set in the batch, the stantdby mode continues until ejection of all the sheets fed, and cutting batch adjustment data is output.
    Restart
11) The job is restarted and, upon completion of feeding all sheets of job 3, the same control as in 7) and 8) is executed.

Although the control unit of the image forming device performs judgement of a cutting position, calculation of the representative value, and output of cutting batch adjustment data (data for determining a cutting position) in the description of the above embodiments, these processes can be performed by the management device as described above. In addition, the image reading device can be provided with a reading control unit (controller) or the like through which image reading results are received for judgement of a cutting position, calculation of the representative value, and the like. Further, cutting batch adjustment data can be output in addition. The control unit can acquire a representative value and output cutting batch adjustment data. The reading control unit includes a CPU and a program that operates on the CPU.

In the above-described embodiments, with a representative value, a cutting position in a cutting batch can be determined, variations between the cutting positions can be made small for higher accuracy, and a reduction in the quality of the printing after cutting can be suppressed.

Although the embodiments of the present invention has been described based on the above-described embodiments, the present invention is not limited to the above description and appropriate modifications of the above-described embodiments can be made without departing from the scope of the present invention.

Although the embodiments of the present invention has been described and illustrated in detail, it is clearly understood that the same is by way of illustrated and example only and is not to be taken by way limitation, the scope of the present invention being interpreted by terms of the appended claims.

What is claimed is:

1. An image forming device comprising:
   an image former that comprises a photoreceptor, a transfer belt, a secondary transferrer, and a fixer, and forms, on a printing sheet, an image for determining a cutting position;
   an image reader that comprises a line sensor or a colorimeter, reads the image formed on the printing sheet, and acquires image data; and
   a controller that outputs data for determining a cutting position for a cutting batch which is a stack of at least two printing sheets, wherein
   the controller:
   obtains a position of the image according to the image data,
   calculates a representative value from positions obtained respectively from a plurality of printing sheets in the cutting batch,
   outputs data for determining the cutting position for the cutting batch according to the representative value, and
   executes a cutting of the cutting batch based on the data for determining the cutting position.

2. The image forming device according to claim 1, wherein the representative value is an average value, a median value, a midpoint value, or a modal value of the positions obtained respectively from a plurality of printing sheets in the cutting batch.

3. The image forming device according to claim 1, wherein the image for determining the cutting position is a trimming mark indicating the cutting position, a printer's mark for real-time adjustment, or a given image formed on the printing sheet.

4. The image forming device according to claim 1, wherein the controller obtains the position of the image according to the image data and corresponding original image data.

5. The image forming device according to claim 1, wherein the controller makes a separation in the cutting batch per printing JOB, per JOB copy, per sequence of JOBs, or per sequence of sheets.

6. The image forming device according to claim 5, wherein the controller allows a separation to be set per sequence of JOBs or sequence of sheets.

7. The image forming device according to claim 5, wherein the controller sets the separation according to information about the determined cutting position.

8. The image forming device according to claim 1, wherein when calculating the representative value, the controller removes the positions that are deviated, by a predetermined amount, from an expected value or from the positions obtained by far.

9. The image forming device according to claim 8, wherein the controller designates as a waste sheet a printing sheet with an image whose position is deviated, by a predetermined amount, from an expected value or from the positions obtained by far.

10. The image forming device according to claim 1, wherein
the data for determining the cutting position for the cutting batch indicates a distance from an edge of the printing sheet to the cutting position, the amount of deviation from an expected cutting position on the printing sheet, or the amount of deviation from a position of a trimming mark formed on an outer surface of a guiding printing sheet in the cutting batch, and
the guiding printing sheet is the first printing sheet in the cutting batch or the last printing sheet in the cutting batch.

11. The image forming device according to claim 10, wherein when an image formation is performed on only one side of the printing sheets in the cutting batch, the controller designates the guiding printing sheet according to an order of the image formation and an orientation of the printing sheets after ejection.

12. The image forming device according to claim 1, wherein the controller outputs the data for determining the cutting position for the cutting batch, by displaying on a display, printing on a printing sheet, or storing in an internal storage and/or an external storage.

13. The image forming device according to claim 12, wherein the controller enables a selection of a method of output of the data for determining the cutting position for the cutting batch.

14. The image forming device according to claim 1, wherein the controller enables a selection of whether to execute output of the data for determining the cutting position for the cutting batch.

15. The image forming device according to claim 14, wherein the controller enables the selection per separation in the cutting batch.

16. The image forming device according to claim 1, further comprising a cutter that cuts the cutting batch according to the cutting position for the cutting batch.

17. An image reading device comprising:
an image reader that comprises a line sensor or a colorimeter, reads an image for determining a cutting position, and acquires image data, wherein the image is formed on a printing sheet; and
a reading controller that outputs data for determining a cutting position for a cutting batch which is a stack of at least two printing sheets, wherein
the reading controller
obtains a position of the image according to the image data,
calculates a representative value from the positions obtained respectively from a plurality of printing sheets in the cutting batch,
outputs data for determining the cutting position for the cutting batch according to the representative value, and
executes a cutting of the cutting batch based on the data for determining the cutting position.

18. An image forming method using an image forming device that includes: an image former comprising a photoreceptor, a transfer belt, a secondary transferrer, and a fixer; an image reader comprising a line sensor or a colorimeter; and a controller, the method comprising:
acquiring, with the image reader, image data on a read image for determining a cutting position, wherein the image is formed, by the image former, on a printing sheet to be cut;
obtaining, with the controller, the position of the image according to the image data;
calculating, with the controller, a representative value from the position obtained respectively from a plurality of printing sheets in the cutting batch which is a stack of at least two printing sheets;
outputting, with the controller, data for determining the cutting position for the cutting batch according to the representative value; and
executing, with the controller, a cutting of the cutting batch based on the data for determining the cutting position.

* * * * *